United States Patent
Frommann et al.

(10) Patent No.: US 9,151,367 B2
(45) Date of Patent: Oct. 6, 2015

(54) ACTUATOR ELEMENT FOR A MOTOR VEHICLE COVER

(71) Applicant: GM GLOBAL TECHNOLOGY OPERATIONS LLC, Detroit, MI (US)

(72) Inventors: Markus Frommann, Bingen am Rhein (DE); Heiko Betzen, Bausendorf (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 14/221,082

(22) Filed: Mar. 20, 2014

(65) Prior Publication Data

US 2014/0283636 A1 Sep. 25, 2014

(30) Foreign Application Priority Data

Mar. 20, 2013 (DE) .......................... 10 2013 004 791

(51) Int. Cl.
*B62D 25/00* (2006.01)
*F16H 21/44* (2006.01)
*B60K 15/05* (2006.01)
*E05B 83/34* (2014.01)
*E05C 19/02* (2006.01)
*E05B 17/00* (2006.01)

(52) U.S. Cl.
CPC ................ *F16H 21/44* (2013.01); *B60K 15/05* (2013.01); *E05B 17/0037* (2013.01); *E05B 83/34* (2013.01); *E05C 19/022* (2013.01); *Y10T 74/18992* (2015.01)

(58) Field of Classification Search
CPC .... B01D 27/08; B01D 35/147; B01D 27/103; B01D 35/15; B60C 19/00; A61M 5/31511; A61M 5/14228; A61M 5/31515; B05C 17/01; F04B 43/082

USPC .......................................... 296/97.22
See application file for complete search history.

(56) References Cited

U.S. PATENT DOCUMENTS

| | | | | |
|---|---|---|---|---|
| 3,554,184 A | * | 1/1971 | Habib | 600/29 |
| 6,439,016 B1 | * | 8/2002 | Wittwer et al. | 70/379 R |
| 8,485,585 B2 | * | 7/2013 | Taniguchi et al. | 296/97.22 |
| 8,845,001 B2 | * | 9/2014 | Kotama et al. | 296/97.22 |
| 8,998,271 B2 | * | 4/2015 | Beck | 292/57 |
| 2009/0139991 A1 | * | 6/2009 | Nakaya | 220/315 |
| 2011/0174102 A1 | * | 7/2011 | Beck | 74/110 |
| 2012/0222356 A1 | * | 9/2012 | Beck | 49/348 |
| 2014/0042768 A1 | * | 2/2014 | Watanabe et al. | 296/97.22 |

FOREIGN PATENT DOCUMENTS

DE 102008057933 A1 7/2010

OTHER PUBLICATIONS

Search Report dated Mar. 19, 2014 for DE 10 2013 004 791.9.

* cited by examiner

*Primary Examiner* — Kiran B Patel
(74) *Attorney, Agent, or Firm* — Ingrassia Fisher & Lorenz PC

(57) ABSTRACT

The present disclosure relates to an actuator element for a motor vehicle cover. The actuator element includes a plunger, which is axially guided on a guide. A slotted link guide with a sliding element and a control surface for guiding the sliding element, positively couple the plunger and the guide. A spring element, elastically couple the plunger and the guide in axial and rotational direction. The control surface includes a first loading section for rotating the plunger as a consequence of an axial movement in closing direction subject to axial and rotational loading of the spring element.

15 Claims, 1 Drawing Sheet

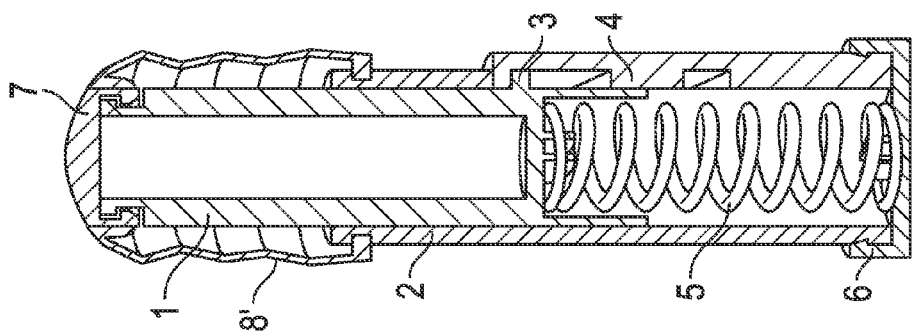
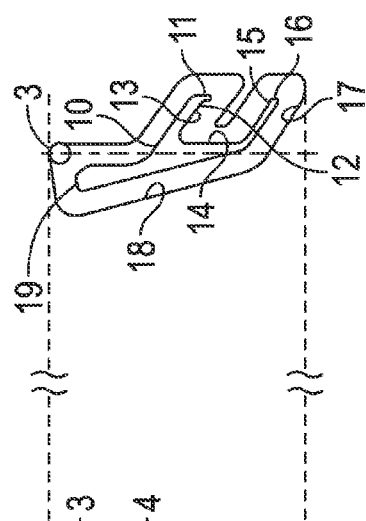
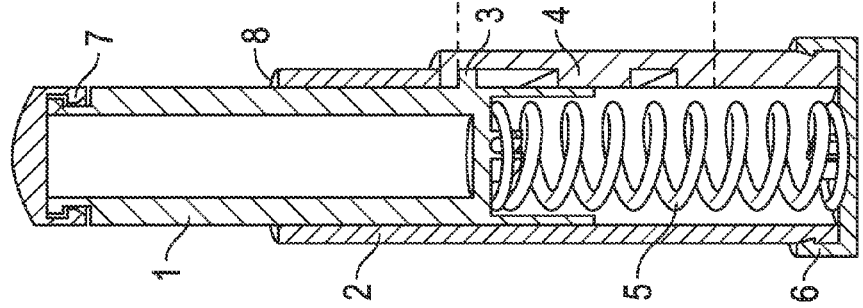

ACTUATOR ELEMENT FOR A MOTOR VEHICLE COVER

CROSS REFERENCE TO RELATED APPLICATION

This application claims priority to German Patent Application No. 102013004791.9 filed Mar. 20, 2013, which is hereby incorporated by reference in its entirety.

TECHNICAL FIELD

The present disclosure relates to an actuator element for a motor vehicle flap or cover, in particular a tank cover, and to a cover arrangement and a motor vehicle having such an actuator element.

BACKGROUND

From US Pat. App. Pub. 2009/0139991 A1 an actuator element for the alternating opening and closing of a motor vehicle tank cover as a consequence of successive actuations in closing direction it is known that if the closed cover is pushed down in closing direction, cams of a plunger are rotated through sloping ramp surfaces of a guide and engage in long axial grooves of the guide when released, so that an axial spring can drive out the plunger against the closing direction and open out the cover. Through renewed pressing down the cams are rotated further and engage in short axial grooves of the guide when released, which prevent an extension of the plunger. Through successive actuations in closing direction, the cams thus rotate endlessly in a rotational direction and alternately engage in the short and long axial grooves, which for this purpose alternate in circumferential direction.

SUMMARY

An object of an embodiment of the present disclosure is to make available a motor vehicle with a cover arrangement having an improved actuator element for the alternating opening out and closing of a motor vehicle cover as a consequence of successive actuations in closing direction.

According to an aspect of the present disclosure, a motor vehicle, such as a passenger car, includes a pivotable cover, in particular a tank cover, and an actuator element, which can axially support itself on the cover. Through successive actuations or successive pressing-down in closing direction of the cover of this actuator element, the latter is alternately retracted and extended. In the extended state, it opens out the cover so that in an embodiment a user can reach behind the substantially flat cover and pivot it open further. In the retracted state, the actuator element by contrast keeps the cover closed.

In an embodiment, the actuator element includes a plunger which is axially guided on a guide. The plunger has a rotation-symmetrical outer circumferential surface which slides in an inner circumferential surface of the guide with a clearance fit. In one embodiment the plunger is formed sleeve or tube-like. Additionally or alternatively, the plunger in an embodiment can include a rotation-symmetrical inner circumferential surface which slides with a clearance fit on an outer circumferential surface of the guide, which is formed as a pin or arbor. The guide can be connected to the vehicle, for example a body or a tank recess in a rotationally and axially fixed manner, while the plunger is supported on the cover. Equally, the plunger can also be connected to the vehicle, for example a body or a tank recess, in a rotationally and axially fixed manner, while the guide is supported on the cover.

In one embodiment, the actuator element includes a slotted link guide with a pin-like sliding element and a control surface for guiding this sliding element, through which the plunger and guide are positively coupled. The control surface can be formed through a side wall of a control groove, in which the sliding element is positively guided, and the width of which can at least substantially correspond to an outer width, in particular and outer diameter of the sliding element.

In an embodiment, the control surface is formed in an inner circumferential surface of a slotted link carrier, which is fastened to the sleeve-like guide, or in the case of an arbor-like guide, is fastened to the plunger. The sliding element is arranged on an outer circumferential surface of the plunger which is guided in a sleeve or the guide which is arbor-like, integrally formed therewith. Equally, the control surface can be formed in an outer circumferential surface of a slotted link carrier, which is fastened to the plunger that is guided in a sleeve or the guide that is arbor-like. The sliding element is arranged on an inner circumferential surface of the guide which is sleeve-like or in the case of an arbor-like guide, on the plunger, integrally formed therewith. The slotted link carrier can be connected to the guide or the plunger in a positive, frictional or materially joined manner, engaged or clipped on. The preferred embodiments with such a slotted link carrier can be separately produced and subsequently fastened to the guide or the plunger to improve producibility thereof.

The actuator element in an embodiment includes a spring element, through which plunger and guide are elastically coupled. In a further development, the spring element can be formed in one piece and connected to the plunger and the guide in an axially and rotationally fixed manner. It can in particular be a coil spring, preferentially of metal.

According to an aspect of the present disclosure, an axial force for driving out the plunger and a torque for engaging the sliding element on the control surface is equally realized through the same spring element. Through this integral design, the installation space, the production and/or assembly effort and/or the weight can be reduced in an embodiment.

In an embodiment, the control surface is formed closed or circumferential. In particular, a control groove defining the control surface, in which the sliding element is guided, can form a closed curve.

According to an aspect, the control surface has a loading section which in the following without restriction of the generality is described as first loading section and is formed in such a manner that the plunger as a consequence of an axial movement in closing direction is rotated by it, wherein the spring element is loaded or tensioned both axially as well as rotationally. Through the spring element, which elastically coupled plunger and guide in rotational direction, a rotational zero position is defined in an embodiment, in which the spring element, at least substantially, does not exert any torque between plunger and guide. The first loading section according to this aspect forms a forced guide, which rotates the plunger out of this rotational zero position when it is axially displaced against the guide. Here, the spring element is loaded in rotational direction and attempts to reset the plunger against this rotation. Rotationally loaded thus is to mean in particular an elastic deformation of the spring element, in particular a torsion of a coil spring which is rotationally fixed on both sides, in which said coil spring exerts a resetting torque. In axial direction, on travelling along the first loading section, the spring element is axially loaded so that it attempts to drive apart plunger and guide or extend the plunger. Axially loaded thus is to mean in particular an elastic deformation of the spring element, in particular a compression of a coil spring which is axially fixed on both sides, in which said coil spring exerts a resetting compressive force. In an embodiment, the spring element at the start of the first loading section can already be axially preloaded, in particular lightly, in order to prevent rattling of the actuator element in an embodiment, so that the spring element as a consequence of an axial movement is further axially loaded in the first loading section.

The first loading section in an embodiment is followed, in particular directly, by an engagement section which is formed in such a manner that the plunger, because of it, can rotate back against the rotational direction in which it is rotated through the first loading section. The engagement section can be formed in such a manner that the plunger can be rotated back into the rotational zero position or beyond. In an embodiment, the engagement section however is formed in such a manner that the spring element is also rotationally loaded in particular in the rotational direction in which it is loaded through the first loading section, when the sliding element is in the engagement section, in particular in order to prevent a rattling of the actuator element in an embodiment. Additionally or alternatively the spring element is axially loaded when the sliding element is in the engagement section or supports itself on the engagement section of the control surface.

Through the first loading section and the following engagement section the plunger in an embodiment can be retracted through pressing-down and engaged in this position, the sliding element, having run over the first loading section engages in the engagement section, wherein the spring element counteracts a movement from the engagement section back into the first loading section.

In a further development, the engagement section includes an undercut, which counteracts a return movement of the sliding element from the engagement section to the first loading section and which, in particular, can extend at least substantially axially against the closing direction.

In an embodiment, a second loading section follows the engagement section, which second loading section is formed in such a manner that the plunger as a consequence of an axial movement is rotated by it in closing direction, in particular in the rotational direction in which it is rotated through the first loading section, wherein the spring element is loaded both axially as well as rotationally.

In an embodiment, the second loading section is followed, in particular directly, by a return section, which is formed in such a manner that through it the sliding element is returned past the engagement section back to the first loading section.

In an embodiment, through the second loading section and the following return section, the plunger which is retracted or engaged in the engagement section can be returned to the first loading section through renewed pressing-down and thus be extended again in order to open out the cover. In this way, the cover, in an embodiment, can be alternately opened out and closed again through successive actuation in closing direction. Here, the second loading section prevents an unintentional return and thus an unintentional extension or opening out. In order to bring this about, the second loading section has to be passed first and the axial force counteracting the latter and the counteracting torque of the spring element overcome in the process.

The first loading section of the control surface in an embodiment has a sloping portion which with the axial closing direction includes an acute angle. This can be followed by an axial portion, which—at least substantially, is parallel to the axial closing direction. Through the sloping portion which is inclined in closing direction the plunger is rotated as a consequence of an axial movement. The following axial portion can in particular form a well-defined transition into the following engagement section and/or counteract an unintentional sliding back of the sliding element into the first loading section. A sloping portion can be additionally or alternatively preceded by a (further) axial portion.

Additionally or alternatively, the engagement section of the control surface in an embodiment can have a sloping portion, which includes an acute angle with the axial closing direction. This can in particular—at least substantially—be parallel to the sloping portion of the first loading section. This can be followed by an axial portion which—at least substantially—is parallel to the axial closing direction. Through the sloping portion which is inclined in closing direction the plunger can rotate back. Through the inclination in closing direction, an axial movement against the closing direction can take place when the sliding element engages. Accordingly, the engagement section in an embodiment is generally formed in such a manner that upon a rotating-back of the plunger the latter, in particular under partial axial relaxing of the spring element, can perform an axial movement against the closing direction through the engagement section. The following axial portion can form in particular a well-defined transition into the following second loading section and/or counteract an unintentional siding-back of the sliding element into the sloping portion of the engagement section.

Additionally or alternatively, the second loading section of the control surface in an embodiment can have a sloping portion, which with the axial closing direction includes an acute angle. This can in particular—at least substantially—be parallel to the sloping portion of the first loading section and/or of the engagement section. This can be followed by an axial portion, which—at least substantially, is parallel to the axial closing direction. Through the sloping portion which is inclined in closing direction the plunger is rotated as a consequence of an axial movement. The following axial portion can in particular form a well-defined transition into the following return section and/or counteract an unintentional sliding-back of the sliding element into the first engagement section.

The acute angle of the sloping portion of the first and/or second loading section and/or of the engagement section in an embodiment amounts to at least 5°, in particular at least 15°, in particular at least 30°. Additionally or alternatively, the acute angle of the sloping portion of the first and/or second loading section and/or of the engagement section in an embodiment amounts to a maximum of 85°, in particular a maximum of 75°, in particular a maximum of 60°.

In an embodiment, the return section is formed for the rotational loading of the spring element in the opposite rotational direction during an axial movement of the plunger against the closing direction. To this end, the return section in an embodiment can have a sloping portion, which with the axial closing direction includes an obtuse angle between 90° and 180°. This can be followed by a portion, which—at least substantially—is perpendicular to the axial closing direction or with the latter includes an acute angle between 0° and 90°. Through the sloping portion which is inclined against the closing direction the plunger is rotated in the opposite rotational direction or against the rotary direction as a consequence of an axial movement against the closing direction, in which it is rotated through the first loading section. Accordingly, the spring element is rotationally loaded out of its rotational zero position in the opposite rotational direction through the sloping portion of the return section. Because of this and/or through the following portion, a well-designed transition into the following first loading section can be formed in particular and/or an unintentional sliding-back of the sliding element counteracted.

As explained above, plunger and guide rotate against one another as a consequence of an axial movement. In particular for this reason, a coupling element for supporting the motor vehicle cover can be rotatably fastened to the plunger or the guide. Because of this, a contact in an embodiment can be improved between the cover and plunger or the guide, in particular a bore friction reduced.

In an embodiment, an axial seal for sealing the plunger against the guide is provided. In a further development, this can be fastened to the coupling element explained above. In particular, it can be formed bellow-like in order to compensate for a retraction and extension movement of the plunger.

In an embodiment, the spring element is connected to a closure element in an axially and rotationally fixed manner, which closure element in turn is releasably or permanently connected to the guide in an axially and rotationally fixed manner, in particular screwed, engaged or clipped together or glued together. Because of this, the production and/or assembly in an embodiment can be improved.

BRIEF DESCRIPTION OF THE DRAWINGS

The present disclosure hereinafter will be described in conjunction with the following drawing figures, wherein like numerals denote like elements, and:

FIG. 1 is an actuator element of a cover arrangement of a motor vehicle shown in a longitudinal section;

FIG. 2 is a slotted link guide of the actuator element of FIG. 1; and

FIG. 3 is an actuator element of a cover arrangement of a motor vehicle according to a further embodiment.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows an actuator element of a cover arrangement of a motor vehicle according to an embodiment of the present disclosure in a longitudinal section. As described in the following, the actuator element can be alternately retracted and extended through successive pressing-down in closing direction (vertically down in FIG. 1) and in the process open out a pivotable tank cover (not shown), on which the actuator element can axially support itself (from the bottom in FIG. 1), so that a user can reach behind the cover and thus pivot it open further. In the retracted state, the actuator element by contrast leaves the cover closed. FIG. 1 shows the actuator element in the extended state.

The actuator element has a plunger 1 formed sleeve or tube-like, which is axially guided in a guide sleeve 2, which is connected to the motor vehicle, for a body or a tank recess, (not shown) in a rotationally and an axially fixed manner.

The actuator element furthermore includes a slotted link guide with a pin-like sliding element 3 and a control surface, which is formed through a side wall of a control groove, in which the sliding element 3 is positively guided, and which in FIG. 2 is shown in detail The control groove is formed in an inner circumferential surface of a slotted link carrier 4, which is clipped to the guide sleeve 2. The sliding element 3 is arranged on an outer circumferential surface of the plunger 1 and integrally formed with the latter.

The actuator element furthermore includes a spring element in the form of a coil spring 5 of metal. The coil spring 5 is connected in a groove of a shoulder of the plunger 1 and on the opposite side in a groove of a closure element in the form of a bottom cap 6 in an axially and rotationally fixed manner, which in turn is clipped to the guide sleeve 2. As will still be explained in more detail in the following, an axial force for driving out the plunger 1 (towards the top in FIG. 1) and a torque for engaging the sliding element 3 in the control groove is equally realized through the coil spring 5.

Through the coil spring 5, a rotational zero position is defined, which is indicated in FIG. 2 in dash-dotted lines and in which the coil spring 5, at least substantially, does not exert any torque between plunger 1 and guide 2.

The control groove, in which the sliding element 3 is guided, forms a closed curve and has a first loading section which is formed in such a manner that through it the plunger 1 as a consequence of an axial movement in closing direction is rotated, wherein the coil spring 5 is loaded both axially as well as rotationally.

To this end, the first loading section has a sloping portion 10, which with the axial closing direction includes an acute angle of approximately 55°. This is followed by an axial portion 11 of the first loading section, which is substantially parallel to the axial closing direction. Through the sloping portion 10 which is inclined in closing direction the plunger 1 is rotated as a consequence of an axial movement. Here, the coil spring 5 is loaded in rotational direction out of the rotational zero position and attempts to reset the plunger 1 against this rotation. In the extended position shown in FIG. 1, in which the sliding element 3 is at the start of the first loading section 10, 11, the coil spring 5 is already slightly preloaded axially. On moving along the first loading section 10, 11, the coil spring 5 is axially further loaded so that it attempts to drive plunger 1 and guide 2 apart or attempt to extend the plunger 1.

The axial portion 11 of the first loading section is directly followed by an engagement section which is formed in such a manner that through it the plunger 1 can rotate back against the rotational direction in which it is rotated through the sloping portion 10 of the first loading section.

To this end, the engagement section has a sloping portion 12, which is substantially parallel to the sloping portion 10 of the first loading section and includes an undercut 13, which counteracts a return movement of the sliding element 3 from the engagement section to the first loading section and substantially extends axially against the closing direction. This is followed by an axial portion 14, which is substantially parallel to the axial closing direction. Through the sloping portion 12, 13 which is inclined in closing direction the plunger can rotate back in the direction of the rotational zero position, wherein through the inclination in closing direction the plunger 1 can retreat a little against the closing direction under the axial force of the coil spring 5 when the sliding element 3 engages. The engagement section is formed in such a manner that the coil spring 5 in the rotational direction in which it is loaded through the first loading section is also rotationally loaded when the sliding element 3 is located in the engagement section in order to prevent rattling of the actuator element. In addition, the coil spring 5 is axially loaded when the sliding element 3 is in the engagement section.

Through the first loading section 10, 11 and the following engagement section 12-14, the plunger 1 can be retracted through pressing-down and engaged in this position: the sliding element 3 following the running over of the first loading section engages in the engagement section, wherein the coil spring 5 counteracts a movement from the engagement section back into the first loading section.

The axial portion 14 of the engagement section is followed by a second loading section which is formed in such a manner that through it the plunger 1 as a consequence of an axial movement in closing direction is rotated in the rotational direction in which it is rotated through the first loading section, wherein the coil spring 5 is loaded both axially as well as rotationally.

To this end, the second loading section has a sloping portion 15, which is substantially parallel to the sloping portion 10 of the first loading section. This is followed by an axial portion 16 of the second loading section, which is substantially parallel to the axial closing direction and in the exemplary embodiment substantially consists of a transition radius.

This axial portion or transition radius 16 of the second loading section is directly followed by a return section, which is formed in such a manner that through it the sliding element 3 is returned past the engagement section 12-14 back to the start (top in FIG. 1) of the first loading section.

The return section is formed for the rotational loading of the coil spring 5 in opposite rotational direction upon an axial movement of the plunger 1 in FIG. 1 towards the top against the closing direction. To this end, the return section has a sloping portion 17, which is substantially parallel to the sloping portion 10 of the first loading section, and through which the coil spring 5 can be reset into the rotational zero position. This sloping portion 17 is followed by a further sloping portion 18, which with the axial closing direction includes an obtuse angle of approximately 160°. Through this further sloping portion 18 which is inclined against the closing direction the plunger 1 as a consequence of an axial movement against the closing direction is rotated in the opposite rotational direction of the first and second loading section. Accordingly, the coil spring 5 is rotationally loaded out of its rotational zero position in opposite rotational direction through this further sloping portion 18 of the return section.

The further sloping portion 18 includes a portion 19 of the return section, which with the axial closing direction includes an acute angle of approximately 80°. This in turn directly follows the sloping portion 10 of the first loading section.

Through the second loading section 15, 16 and the following return section 17-19 the plunger 1 which is retracted or engaged in the engagement section can be returned to the start of the sloping portion 10 of the first loading section through renewed pressing-down and thus extended again in order to open out the cover. In this way, the cover can be alternately opened out and closed again through successive actuating in closing direction. Here, the sloping portion 15 of the second loading section prevents an unintentional return and thus an unintentional extending or opening out: in order to bring this about, the second loading section has to be passed through first and the axial force counteracting the latter and the counteracting torque of the spring element initially overcome.

On the plunger, a coupling element 7 for supporting the motor vehicle cover is rotatably fastened. Because of this, a contact between the cover and plunger 1 can be improved.

In the embodiment of FIG. 1, an annular axial seal 8 for sealing the plunger 1 against the guide sleeve 2 is fastened to the face end of the latter. In the embodiment of FIG. 3, which otherwise corresponds to FIG. 1, so that in it same elements are marked with the same reference characters and reference is made to the preceding description, a bellows-like axial seal 8' is fastened to the coupling element 7.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An actuator element for a motor vehicle cover, comprising:
    a plunger axially guided on a guide;
    a slotted link guide with a sliding element and a control surface for guiding the sliding element through which the plunger and the guide are positively coupled; and
    a spring element elastically coupling the plunger and the guide in an axial and rotational direction;
    wherein the control surface includes a first loading section for rotating the plunger in response to an axial movement in a closing direction subject to axial and rotational loading of the spring element.

2. The actuator element according to claim 1, wherein the spring element comprises a one-piece spring connected to the plunger and the guide in an axially and rotationally fixed manner.

3. The actuator element according to claim 1, wherein the spring element comprises a coil spring.

4. The actuator element according to claim 1, wherein the control surface comprises an engagement section following the first loading section for rotating back the plunger.

5. The actuator element according to claim 4, wherein the control surface comprises:
    a second loading section following the engagement section for rotating the plunger in rotational direction as a consequence of an axial movement in closing direction subject to axial and rotational loading of the spring element; and
    a return section following the second loading section for guiding the sliding element past the engagement section back to the first loading section.

6. The actuator element according to claim 5, wherein the return section is formed for the rotational loading of the spring element in opposite rotational direction during an axial movement of the plunger against the closing direction.

7. The actuator element according to claim 4 wherein the engagement section has an undercut.

8. The actuator element according to claim 1 wherein at least one section of the control surface has a sloping portion, which with the axial closing direction defines an included angle.

9. The actuator element according to claim 8, wherein the sloping portion is followed by an axial portion, which is substantially parallel to the axial closing direction.

10. The actuator element according to claim 8, wherein the sloping portion is followed by a portion, which is at least substantially perpendicular to the axial closing direction and includes an acute angle therewith.

11. The actuator element according to claim 1, wherein the control surface is formed in an inner circumferential surface of a slotted link carrier which is fastened to the guide.

12. The actuator element according to claim 1, further comprising an axial seal for sealing the plunger against the guide.

13. The actuator element according to claim 1, wherein the spring element is connected to a closure element in an axially and rotationally fixed manner, which is connected to the guide in an axially and rotationally fixed manner.

14. The actuator element according to claim 1 further comprising a coupling element for supporting the motor vehicle cover, which is rotatably fastened to one of the plunger or the guide.

15. The actuator element according to claim 1 in combination with a pivotable cover on a vehicle body, the actuator element disposed between the pivotable cover and the vehicle body and operable to alternately open and close the pivotable cover as a consequence of successive actuations in closing direction.

* * * * *